United States Patent
Ohta et al.

(10) Patent No.: US 10,610,050 B2
(45) Date of Patent: Apr. 7, 2020

(54) HEATING COOKER

(71) Applicant: Panasonic Intellectual Property Management Co., Ltd., Osaka-shi, Osaka (JP)

(72) Inventors: Katsuyuki Ohta, Shiga (JP); Makoto Nishimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 363 days.

(21) Appl. No.: 15/537,291

(22) PCT Filed: Aug. 3, 2016

(86) PCT No.: PCT/JP2016/003570
§ 371 (c)(1),
(2) Date: Jun. 16, 2017

(87) PCT Pub. No.: WO2017/033408
PCT Pub. Date: Mar. 2, 2017

(65) Prior Publication Data
US 2017/0347833 A1 Dec. 7, 2017

(30) Foreign Application Priority Data

Aug. 27, 2015 (JP) .................. 2015-167694

(51) Int. Cl.
*A47J 36/16* (2006.01)
*A47J 37/06* (2006.01)
*A47J 27/00* (2006.01)

(52) U.S. Cl.
CPC ............. *A47J 36/165* (2013.01); *A47J 27/00* (2013.01); *A47J 37/0623* (2013.01)

(58) Field of Classification Search
CPC .......... A47J 36/165; A47J 43/04; A47J 27/00; A47J 37/0623
(Continued)

(56) References Cited

U.S. PATENT DOCUMENTS

2002/0027175 A1* 3/2002 Capp ..................... A47J 43/046
241/199.12
2007/0133345 A1* 6/2007 Zarom ................ B01F 7/00183
366/146
(Continued)

FOREIGN PATENT DOCUMENTS

EP 2042066 A1 4/2009
JP 50-61151 U 6/1975
(Continued)

OTHER PUBLICATIONS

International Search Report and English language translation thereof, in corresponding International Application No. PCT/JP2016/003570, dated Sep. 27, 2016, 5 pages.
(Continued)

*Primary Examiner* — Phuong T Nguyen
(74) *Attorney, Agent, or Firm* — Brinks Gilson & Lione

(57) ABSTRACT

A heating cooker with a stirring function includes a stirring body configured to stir cooking materials that include liquid and a solid and are housed in a cooking container. The stirring body includes a housing rotatably mounted to a center of a bottom surface of the cooking container, and a lower blade that extends from an outer peripheral surface of the housing toward an inner peripheral surface of the cooking container and is configured to push at least one of the cooking materials that is positioned near the bottom surface of the cooking container toward the inner peripheral surface of the cooking container. The stirring body further includes an upper blade that extends from the outer peripheral surface of the housing toward the inner peripheral surface of the
(Continued)

cooking container and is configured to cause at least one of the cooking materials that is near a liquid surface to sink toward the bottom surface of the cooking container.

14 Claims, 15 Drawing Sheets

(58) Field of Classification Search
USPC .................................. 99/348, 352, 409, 453
See application file for complete search history.

(56) References Cited

U.S. PATENT DOCUMENTS

| | | | | |
|---|---|---|---|---|
| 2010/0028514 | A1* | 2/2010 | Goderiaux | A47J 36/165 |
| | | | | 426/438 |
| 2012/0291637 | A1* | 11/2012 | Yu | A47J 43/0465 |
| | | | | 99/453 |
| 2014/0000462 | A1 | 1/2014 | Payen | |
| 2014/0290499 | A1 | 10/2014 | Murbacher et al. | |

FOREIGN PATENT DOCUMENTS

| | | |
|---|---|---|
| JP | 62-8840 Y2 | 3/1987 |
| JP | 7-89984 B2 | 10/1995 |
| JP | 5250428 B2 | 7/2013 |
| JP | 2014-504913 A | 2/2014 |
| JP | 2014-217412 A | 11/2014 |
| JP | 2014-533544 A | 12/2014 |
| WO | 2012/080674 A1 | 6/2012 |

OTHER PUBLICATIONS

The Extended European Search Report dated Jun. 12, 2018 for the related European Patent Application No. 16838760.3.
Communication pursuant to Article 94(3) EPC dated Jul. 23, 2019 for the related European Patent Application No. 16838760.3.

* cited by examiner

HEATING COOKER

This application is a 371 application of PCT/JP2016/003570 having an international filing date of Aug. 3, 2016, which claims priority to JP 2015-167694 filed Aug. 27, 2015, the entire contents of which are incorporated herein by reference.

TECHNICAL FIELD

The present invention relates to a heating cooker with a stirring function which includes a stirring body configured to stir cooking materials in a cooking container.

BACKGROUND ART

A stirring body of a conventional heating cooker of this type is rotatably mounted to a center of a bottom surface of a cooking container, and is configured to stir cooking materials by rotating near the bottom surface of the cooking container (refer to, for example, PTL 1 or PTL 2).

CITATION LIST

Patent Literature

PTL 1: Japanese Patent No. 5,250,428
PTL 2: Japanese Translation of PCT Publication No. 2014-533544

SUMMARY OF THE INVENTION

However, in cases where cooking materials including liquid and solids, such as materials for borscht, are cooked, the conventional stirring body has difficulty in stirring the cooking materials in a desirable manner because more solids lose their shape and do not mix well with the liquid than expected.

The present invention provides a heating cooker with a stirring function that is capable of stirring cooking materials including liquid and a solid in a more desirable manner.

A heating cooker according to the present invention is a heating cooker with a stirring function which includes a stirring body configured to stir cooking materials that include liquid and a solid and are housed in a cooking container. The stirring body includes a housing rotatably mounted to a center of a bottom surface of the cooking container, and a lower blade that extends from an outer peripheral surface of the housing toward an inner peripheral surface of the cooking container and is configured to push at least one of the cooking materials that is positioned near the bottom surface of the cooking container toward the inner peripheral surface of the cooking container. The stirring body further includes an upper blade that extends from the outer peripheral surface of the housing toward the inner peripheral surface of the cooking container and is configured to cause at least one of the cooking materials that is positioned above the lower blade to sink toward the bottom surface of the cooking container.

With this structure, the cooking materials including the liquid and the solid can be stirred in a more desirable manner in the heating cooker of the present invention.

DETAILED DESCRIPTION OF THE PREFERRED EMBODIMENT (Findings Underlying the Present Invention)

For the purpose of enabling more desirable stirring of cooking materials including liquid and solids, inventors of the present invention studied intensively, and as a result, obtained findings which are as follows.

A conventional stirring body is configured to stir the cooking materials by rotating near a bottom surface of a cooking container. However, among the solids, there are solids that have lower specific gravities than the liquid and float near a liquid surface of the liquid. In this case, rotating the stirring body near the bottom surface of the cooking container at normal speed does not enable sufficient stirring of the solids floating near the liquid surface.

On the other hand, in a case where the stirring body is rotated at high speed, stirring force improves, thus enabling sufficient stirring of the solids floating near the liquid surface. In that case, however, collisions between the solids and the stirring body increase in frequency near the bottom surface of the cooking container, and impact force increases. As a result, more solids lose their shape than expected.

As a result of an intensive study based on these new findings, the inventors of the present invention found that the cooking materials including the liquid and the solids could be stirred in a more desirable manner by providing, in addition to a lower blade, an upper blade configured to cause those cooking materials positioned above the lower blade to sink toward the bottom surface of the cooking container. In consideration of these respects, the inventors have reached the present invention which is described hereinafter.

An exemplary embodiment of the present invention is described hereinafter with reference to the accompanying drawings. It is to be noted that the present invention is not limited to the exemplary embodiment.

Exemplary Embodiment

Figure 1:
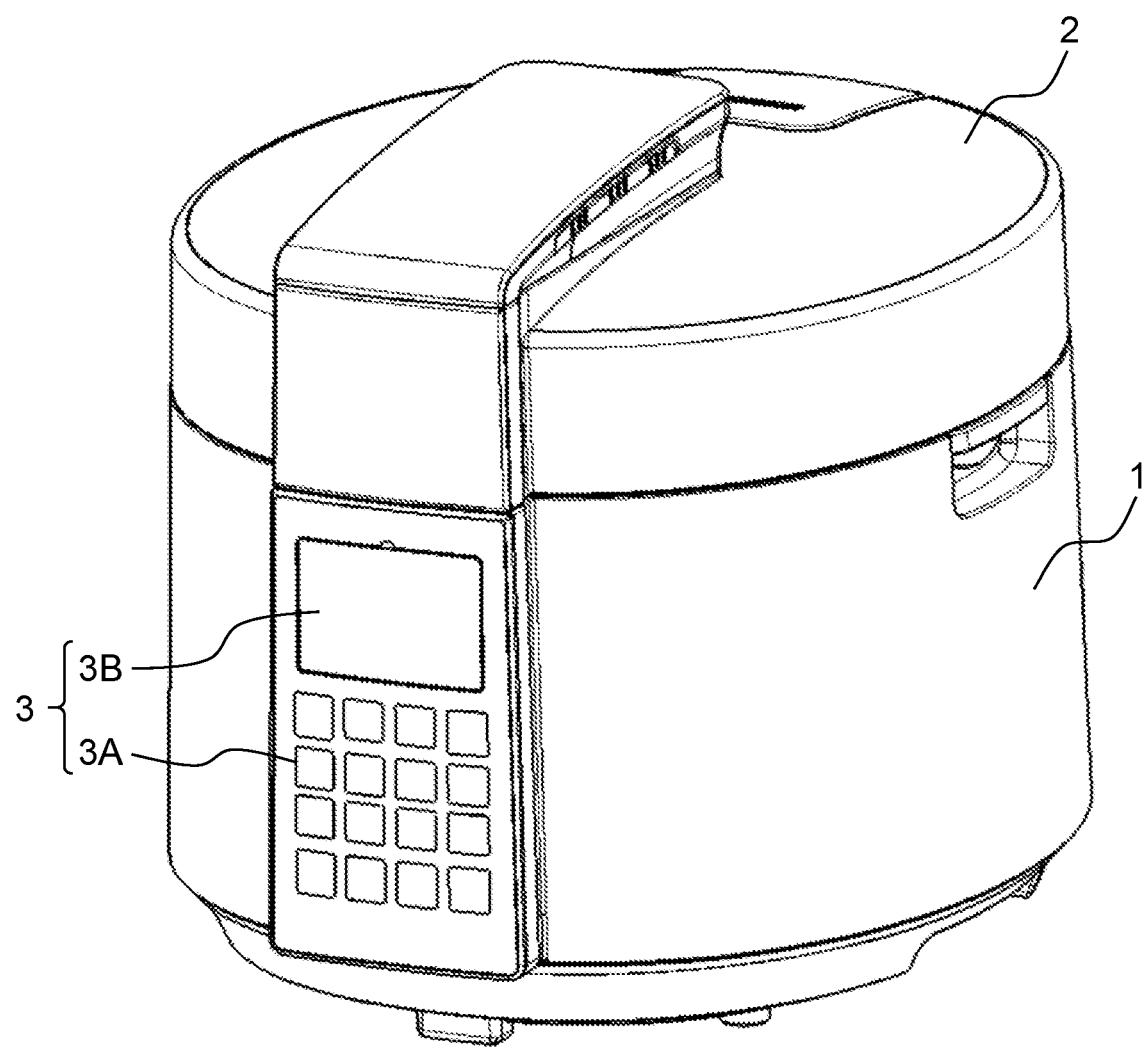
FIG. 1 is a perspective view of a heating cooker with a stirring function according to an exemplary embodiment of the present invention.
Figure 2:
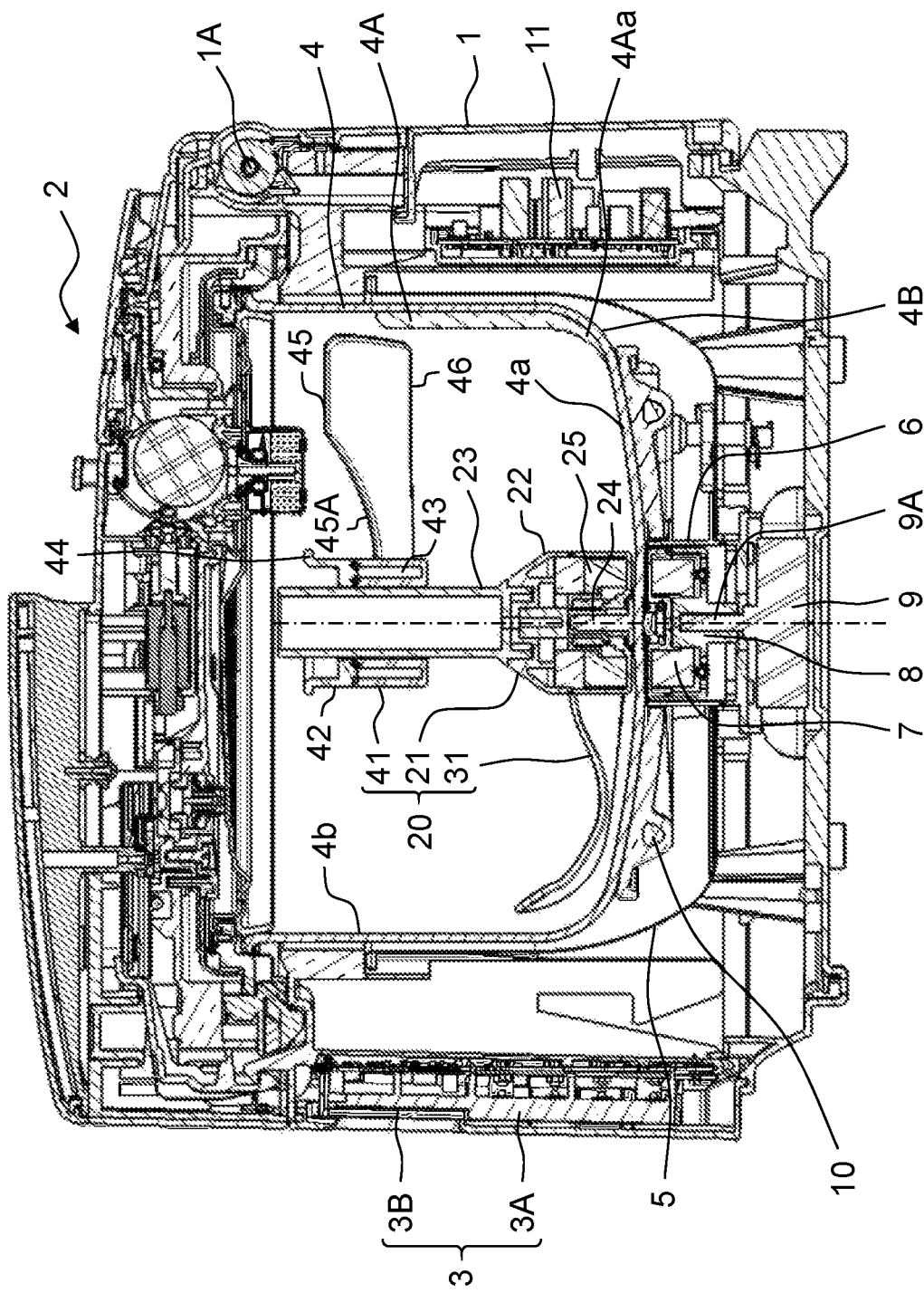
FIG. 2 is a sectional view of the heating cooker with the stirring function according to the exemplary embodiment of the present invention.

A heating cooker according to the exemplary embodiment of the present invention is a heating cooker with a stirring function which includes a stirring body configured to stir cooking materials housed in a cooking container. FIG. 1 is a perspective view of the heating cooker according to the present exemplary embodiment. FIG. 2 is a sectional view of the heating cooker of FIG. 1.

As shown in FIG. 1, the heating cooker of the present exemplary embodiment includes apparatus body 1 having a substantially bottomed cylindrical shape, and openable lid 2 that covers an upper opening of apparatus body 1. As shown in FIG. 2, lid 2 is rotatably mounted to hinge part 1A provided at an upper rear part (upper right in FIG. 2) of apparatus body 1.

Apparatus body 1 has, at its front, operation unit 3 provided for various operations including selection of a cooking menu. Operation unit 3 includes operation key group 3A and display 3B. Operation key group 3A includes, for example, a start key, a cancel key, and a select key used for selecting the cooking menu. Display 3B is formed of, for example, a liquid crystal display panel and displays various pieces of information such as information set by means of the operation key group.

As shown in FIG. 2, storage part 5 having a bottomed cylindrical shape is provided inside apparatus body 1 to receive detachable cooking container 4. Motor holder 6 is provided at a bottom center of storage part 5 in such a manner as to partly pass through the bottom center of storage part 5. Motor holder 6 accommodates ring-shaped driving magnet 7 and magnet holder 8 holding driving magnet 7. Motor 9 that generates rotational driving force has its drive shaft 9A inserted into a center of magnet holder 8. Motor 9 is provided externally of storage part 5 and is held by motor holder 6. As motor 9 is driven, drive shaft 9A rotates on its axis, and magnet holder 8 and driving magnet 7 rotate accordingly.

Heater 10 for heating cooking container 4 is provided externally of motor holder 6 and at an inner bottom of storage part 5. In the present exemplary embodiment, heater 10 is a sheathed heater that transmits heat by making contact with a bottom wall of cooking container 4. Heater 10 is formed to be substantially annular and is provided in a position opposed to an outer border of the bottom wall of cooking container 4.

Controller 11 controls driving of motor 9 and driving of heater 10. Controller 11 is disposed externally of storage part 5 but inside apparatus body 1. Based on the various pieces of information set by means of operation unit 3 and through use of, for example, a temperature sensor (not illustrated) provided inside apparatus body 1, controller 11 controls driving of devices including motor 9 and heater 10.

Cooking container 4 is a container capable of housing cooking materials including liquid such as water and solids such as meat chunks and/or vegetables. Cooking container 4 accommodates stirring body 20 that stirs the cooking materials.

Stirring body 20 includes housing 21 rotatably mounted to a center of bottom surface 4a of cooking container 4, and lower blade 31 and upper blade 41 that extend from an outer peripheral surface of housing 21 toward inner peripheral surface 4b of cooking container 4. Lower blade 31 is configured to push cooking materials positioned near bottom surface 4a of cooking container 4 toward inner peripheral surface 4b of cooking container 4. Upper blade 41 is configured to cause cooking materials positioned above lower blade 31 to sink toward bottom surface 4a of cooking container 4.

Housing 21 includes lower housing part 22 to which lower blade 31 is mounted and upper housing part 23 to which upper blade 41 is mounted.

Lower housing part 22 is formed in, for example, a substantially cylindrical shape that is hollow. Lower blade 31 is fixed to an outer peripheral surface of lower housing part 22. Lower housing part 22 accommodates shaft 24 that serves as a rotating shaft, and ring-shaped driven magnet 25 disposed to surround shaft 24. Driven magnet 25 and driving magnet 7 disposed below and externally of cooking container 4 form a magnetic coupling. Stirring body 20 is detachably mounted to the center of bottom surface 4a of cooking container 4 via the magnetic coupling and rotates on an axis of shaft 24 when motor 9 is driven.

Upper housing part 23 is formed to have, for example, a substantially cylindrical shape. Upper blade 41 is detachably connected to an outer peripheral surface of upper housing part 23. A lower end portion of upper housing part 23 is detachably connected to an upper end portion of lower housing part 22. Upper housing part 23 is disposed to be coaxial with shaft 24.

Upper blade 41 includes substantially cylindrical movable part 42 that is vertically movable along the outer peripheral surface of upper housing part 23. By having movable part 42, upper blade 41 is vertically movable on the outer peripheral surface of upper housing part 23 and is detachably connected to the outer peripheral surface of upper housing part 23. Moreover, upper blade 41 is disposed to vertically cross a liquid surface of the liquid and is configured to cause cooking materials near the liquid surface to sink toward bottom surface 4a of cooking container 4. In the present exemplary embodiment, upper blade 41 is configured to float by buoyancy exerted by the liquid. Movable part 42 is configured to move vertically according to fluctuation of the liquid surface. Hollow part 43 is provided inside a side wall of movable part 42 for the purpose of effecting the buoyancy. Upper blade 41 also includes handle 44 on an upper end of movable part 42, which is a portion exposed from the liquid as a result of upper blade 41 floating by the buoyancy exerted by the liquid. Handle 44 facilitates mounting and dismounting of upper blade 41 to and from upper housing part 23.

Figure 3:
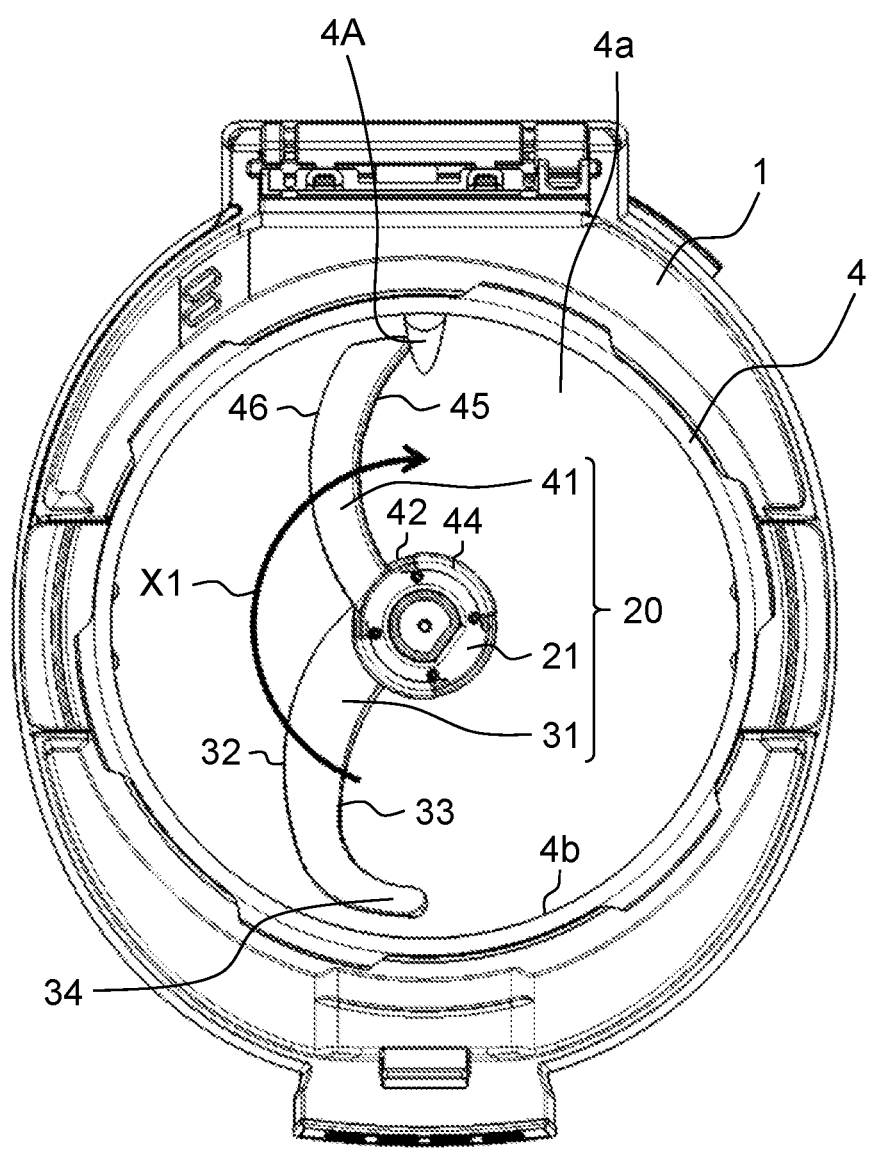
FIG. 3 is a plan view illustrating the heating cooker with the stirring function that has a lid removed therefrom according to the exemplary embodiment of the present invention.

FIG. 3 is a plan view illustrating the heating cooker of FIG. 1 with lid 2 removed therefrom. As shown in FIG. 3, lower blade 31 of stirring body 20 is formed to curve convexly toward a downstream side in rotating direction X1 of housing 21 in plan view. Lower blade 31 includes front edge 32 positioned on the downstream side in rotating direction X1, and rear edge 33 positioned upstream of front edge 32 in rotating direction X1. Leading end portion 34 of lower blade 31 is formed to curve along inner peripheral surface 4b of cooking container 4 in plan view.

Upper blade 41 of stirring body 20 is configured to draw cooking materials that are positioned near the liquid surface and at inner peripheral surface 4b of cooking container 4 toward housing 21 along with the rotation of stirring body 20. In the present exemplary embodiment, upper blade 41 is formed to curve convexly toward an upstream side in rotating direction X1 of housing 21 in plan view.

Moreover, upper blade 41 is disposed to be displaced in rotating direction X1 with respect to lower blade 31 in plan view. In the present exemplary embodiment, upper blade 41 disposed is displaced about 180° in rotating direction X1 with respect to lower blade 31 in plan view. Furthermore, upper blade 41 includes front edge 45 positioned on the downstream side in rotating direction X1, and rear edge 46 positioned upstream of front edge 45 in rotating direction X1.

Inner peripheral surface 4b of cooking container 4 is provided with obstacle 4A that extends vertically and projects toward a center of cooking container 4. Leading end portion 34 of lower blade 31 and upper blade 41 are each spaced a predetermined clearance away from inner peripheral surface 4b of cooking container 4 so as not to come into contact with obstacle 4A during rotation around the axis of shaft 24. A detailed explanation of obstacle 4A is given later.

A more detailed explanation is given next of the respective structures of lower blade 31 and upper blade 41.

Figure 4:
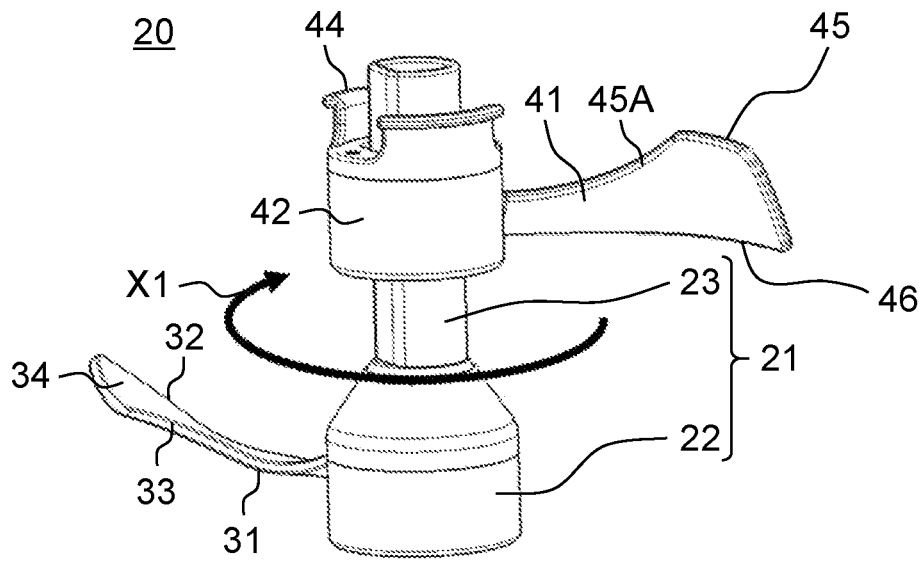
FIG. 4 is a perspective view of a stirring body of the heating cooker with the stirring function according to the exemplary embodiment of the present invention.
Figure 5:
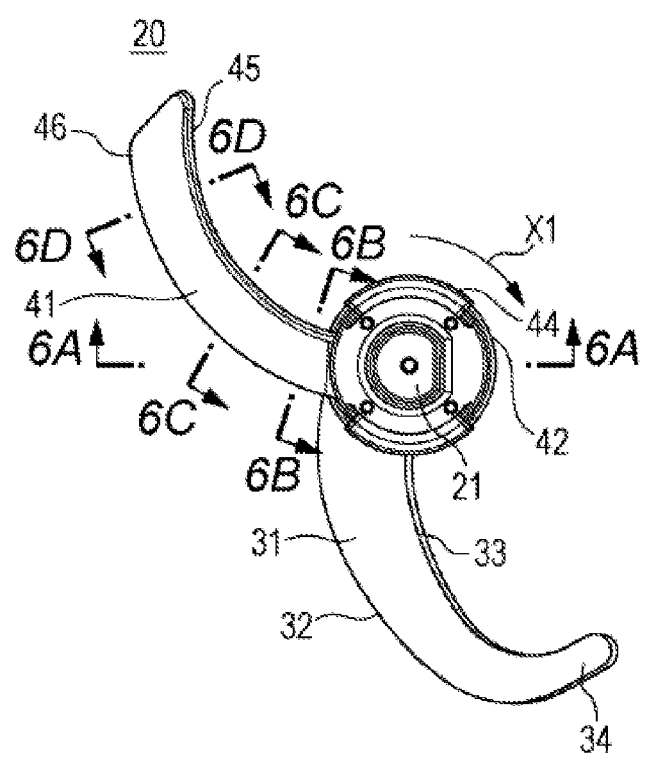
FIG. 5 is a plan view of the stirring body of the heating cooker with the stirring function according to the exemplary embodiment of the present invention.
Figure 6A:
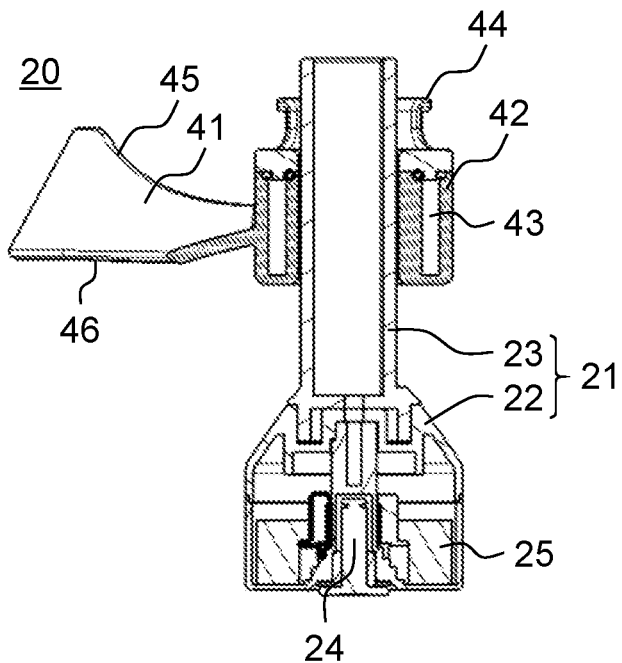
FIG. 6A is a sectional view taken along 6A-6A of FIG. 5.
Figure 6B:
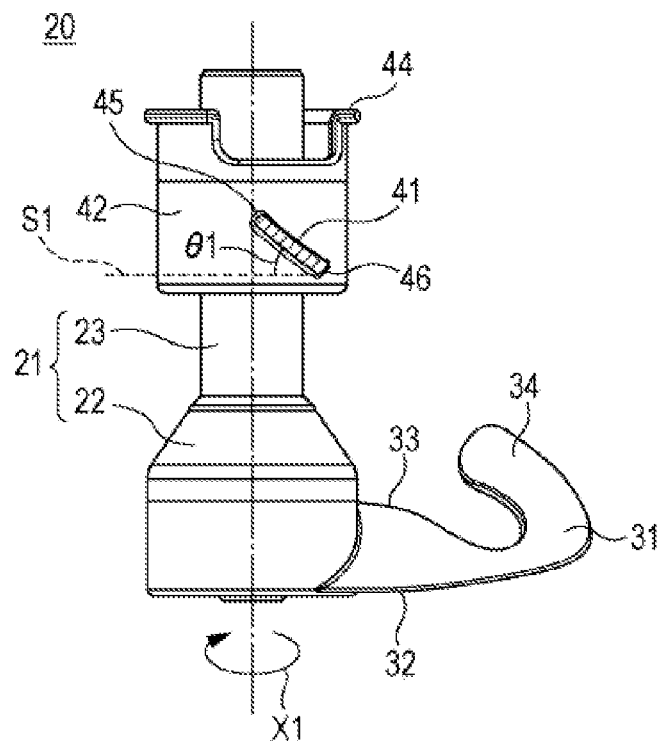
FIG. 6B is a sectional view taken along 6B-6B of FIG. 5.
Figure 6C:
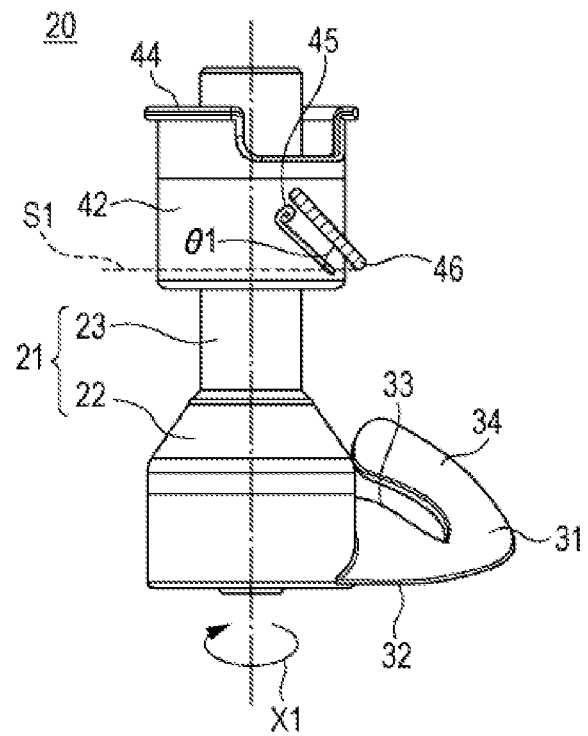
FIG. 6C is a sectional view taken along 6C-6C of FIG. 5.
Figure 6D:
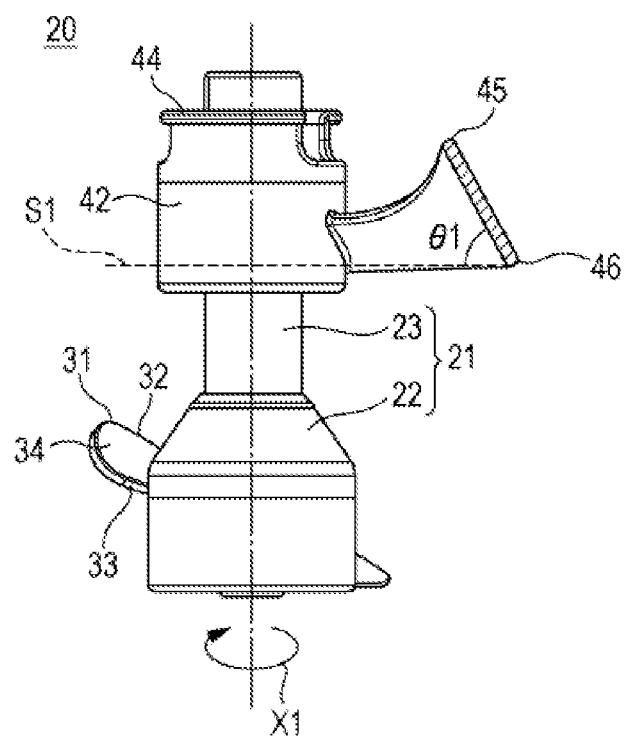
FIG. 6D is a sectional view taken along 6D-6D of FIG. 5.

FIG. 4 is a perspective view of stirring body 20, and FIG. 5 is a plan view of stirring body 20. FIG. 6A is a sectional view taken along 6A-6A of FIG. 5, FIG. 6B is a sectional view taken along 6B-6B of FIG. 5, FIG. 6C is a sectional view taken along 6C-6C of FIG. 5, and FIG. 6D is a sectional view taken along 6D-6D of FIG. 5.

As shown FIGS. 3 to 5, lower blade 31 is formed by twisting one plate member in the present exemplary embodiment. Front edge 32 of lower blade 31 is positioned below rear edge 33 near lower housing part 22. In other words, lower blade 31 is formed to slope upward toward the upstream side in rotating direction X1 near lower housing part 22. A portion of lower blade 31 that is near lower housing part 22 functions to push the cooking materials toward inner peripheral surface 4b of cooking container 4 along with the rotation of blade 31.

Lower blade 31 is formed so that a height of rear edge 33 decreases in a direction away from the outer peripheral surface of lower housing part 22 and front edge 32 and rear edge 33 have an identical height or substantially identical height near inner peripheral surface 4b of cooking container 4. A portion of lower blade 31 that is near inner peripheral surface 4b of cooking container 4 functions to allow the cooking materials to climb over lower blade 31 along with the rotation of blade 31.

Leading end portion 34 of lower blade 31 is formed to slope upward toward the upstream side in rotating direction X1. Along with the rotation of blade 31, leading end portion 34 of lower blade 31 functions to bring up cooking materials accumulated near inner peripheral surface 4b of cooking container 4 and turn over the cooking materials when the cooking materials fall.

Near leading end portion 34 of lower blade 31, rear edge 33 is positioned to be below front edge 32 and to be closer to housing 21 than front edge 32 is. This means that leading end portion 34 of lower blade 31 is formed to slope downward toward housing 21. Thus, the cooking materials that go up leading end portion 34 of lower blade 31 along with the rotation of lower blade 31 fall easily toward housing 21.

As shown FIGS. 3 to 6D, a blade part of upper blade 41 is formed by twisting one plate member in the present exemplary embodiment. As shown in FIG. 6B, front edge 45 of upper blade 41 is positioned above rear edge 46 near upper housing part 23. In other words, upper blade 41 is formed to slope downward toward the upstream side in rotating direction X1 near upper housing part 23. A portion of upper blade 41 that is near upper housing part 23 functions to cause the cooking materials positioned above lower blade 31 to sink toward bottom surface 4a of cooking container 4 along with rotation of upper blade 41.

As shown in FIGS. 6B to 6D, angle $\theta 1$ at which upper blade 41 is inclined with respect to plane 51 parallel to rotating direction X1 decreases in a direction from inner peripheral surface 4b of cooking container 4 toward the outer peripheral surface of housing 21. Accordingly, upper blade 41 can catch the cooking materials positioned near inner peripheral surface 4b of cooking container 4 more reliably and draw these cooking materials toward housing 21. As these cooking materials are drawn inward, downward pushing force can be increased, so that the cooking materials can be caused to sink toward bottom surface 4a of cooking container 4 with more reliability.

Front edge 45 that serves as an upper edge of upper blade 41 has portion 45A that curves or slopes upward from the outer peripheral surface of housing 21 toward inner peripheral surface 4b of cooking container 4. Upper blade 41 thus has a portion that is increased in size for exposure from the liquid surface. Consequently, upper blade 41 can catch the cooking materials near the liquid surface more reliably and cause these cooking materials to sink toward bottom surface 4a of cooking container 4.

A description is given next of stirring action of stirring body 20 on the cooking materials.

Figure 7A:
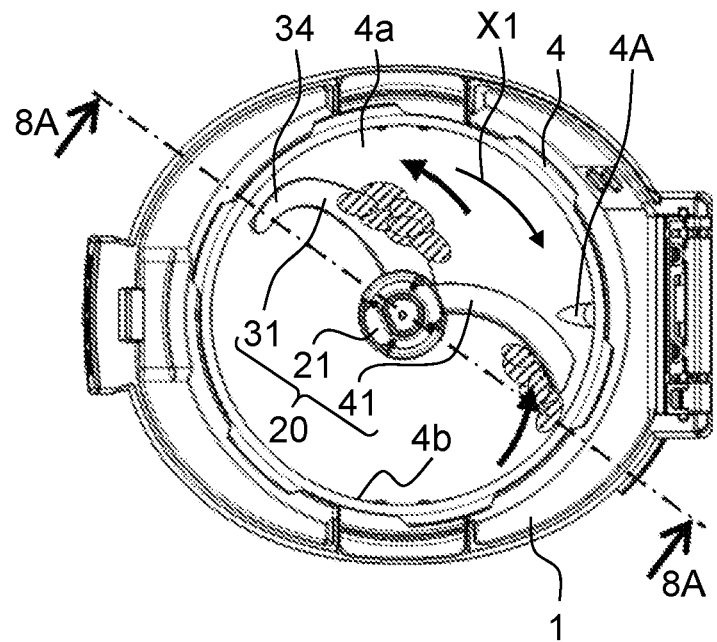
FIG. 7A is a plan view illustrating the stirring body stirring cooking materials in the heating cooker with the stirring function according to the exemplary embodiment of the present invention.
Figure 7B:
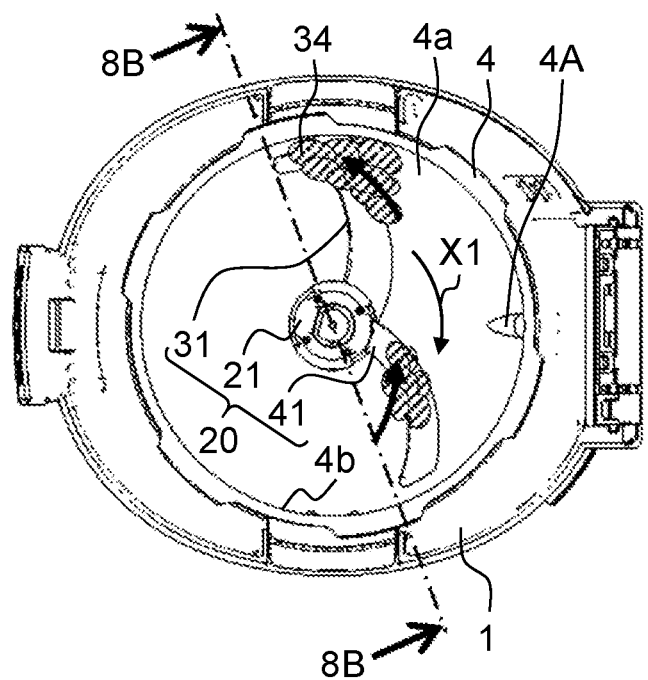
FIG. 7B is a plan view illustrating the stirring body stirring the cooking materials in the heating cooker with the stirring function according to the exemplary embodiment of the present invention.
Figure 7C:
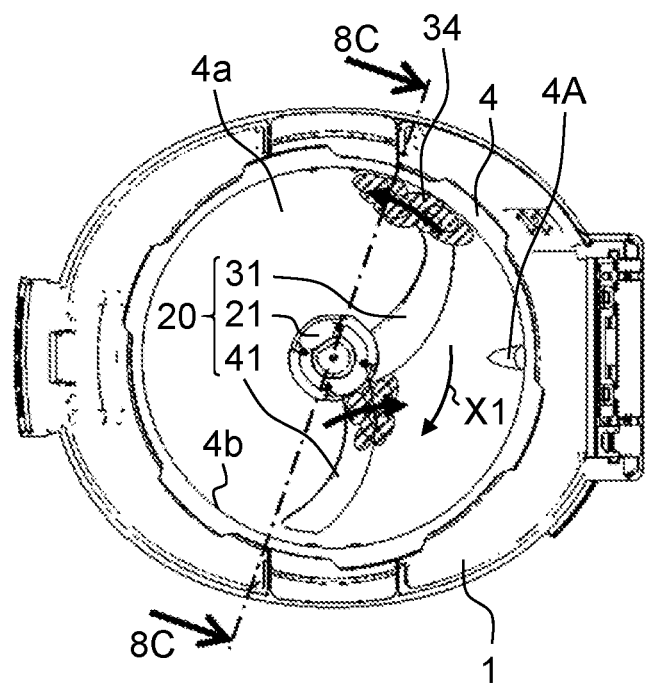
FIG. 7C is a plan view illustrating the stirring body stirring the cooking materials in the heating cooker with the stirring function according to the exemplary embodiment of the present invention.

FIGS. 7A to 7D are plan views each illustrating stirring body 20 stirring the cooking materials. FIG. 8A is a sectional view taken along 8A-8A of FIG. 7A, FIG. 8B is a sectional view taken along 8B-8B of FIG. 7B, FIG. 8C is a sectional view taken along 8C-8C of FIG. 7C, and FIG. 8D is a sectional view taken along 8D-8D of FIG. 7D.

The following description refers to a case where cooking materials including liquid and solids, such as materials for borscht are cooked. It is to be noted that those cooking materials hatched by oblique lines in FIGS. 7 and 8 represent the solids.

First, motor 9 is driven to transmit its rotational force to stirring body 20 via the magnetic coupling formed by driving magnet 7 and driven magnet 25, whereby stirring body 20 rotates in rotating direction X1. Lower blade 31 thus comes into contact with solids as shown in FIGS. 7A and 8A, while upper blade 41 comes into contact with solids near liquid surface L.

Figure 8A:
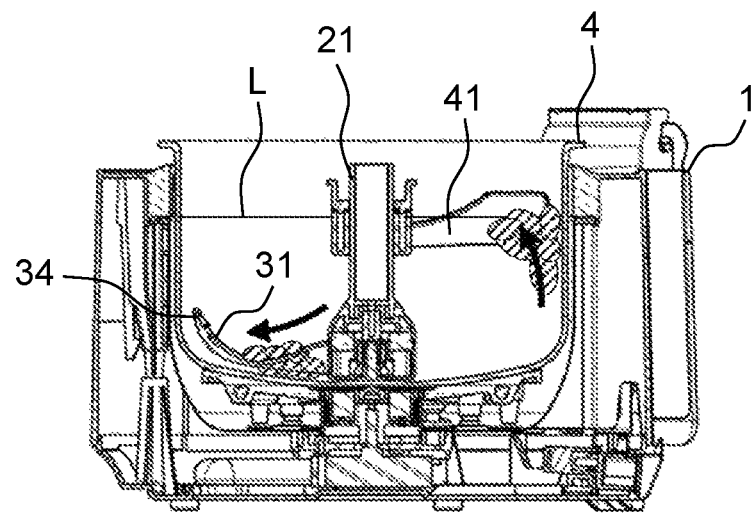
FIG. 8A is a sectional view taken along 8A-8A of FIG. 7A.
Figure 8B:
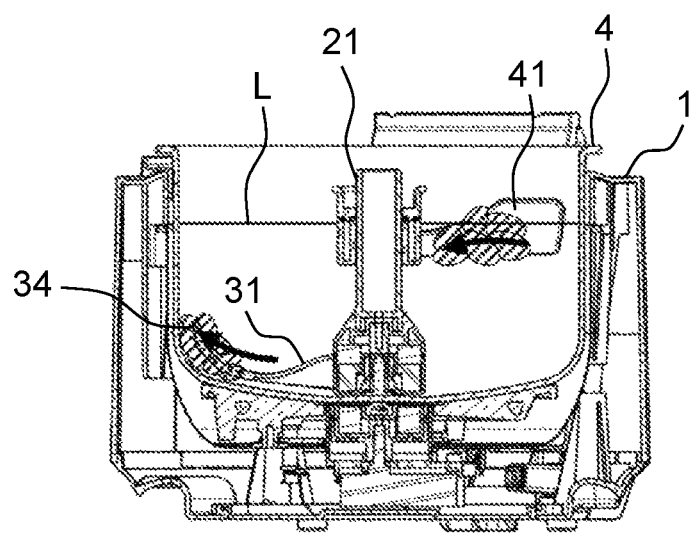
FIG. 8B is a sectional view taken along 8B-8B of FIG. 7B.

Thereafter, as stirring body 20 rotates further in rotating direction X1, lower blade 31 pushes the solids from housing 21 toward inner peripheral surface 4b of cooking container 4 as shown in FIGS. 7B and 8B, and these solids ride on leading end portion 34 of lower blade 31. At this time, upper blade 41 draws the solids near liquid surface L toward housing 21.

Thereafter, as stirring body 20 rotates further in rotating direction X1, the solids riding on leading end portion 34 of lower blade 31 are raised above lower blade 31 as shown in FIGS. 7C and 8C. At this time, upper blade 41 causes the solids drawn toward housing 21 in a direction from liquid surface L to sink toward bottom surface 4a of cooking container 4.

Figure 7D:
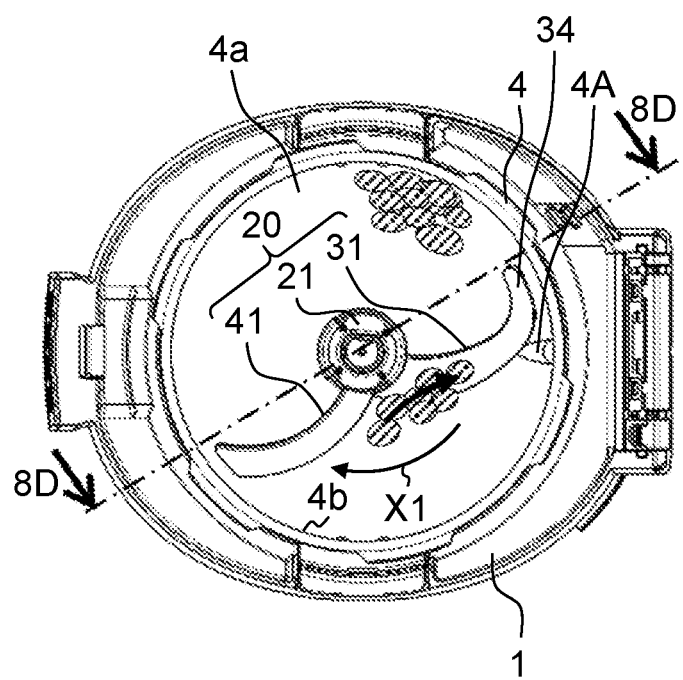
FIG. 7D is a plan view illustrating the stirring body stirring the cooking materials in the heating cooker with the stirring function according to the exemplary embodiment of the present invention.
Figure 8C:
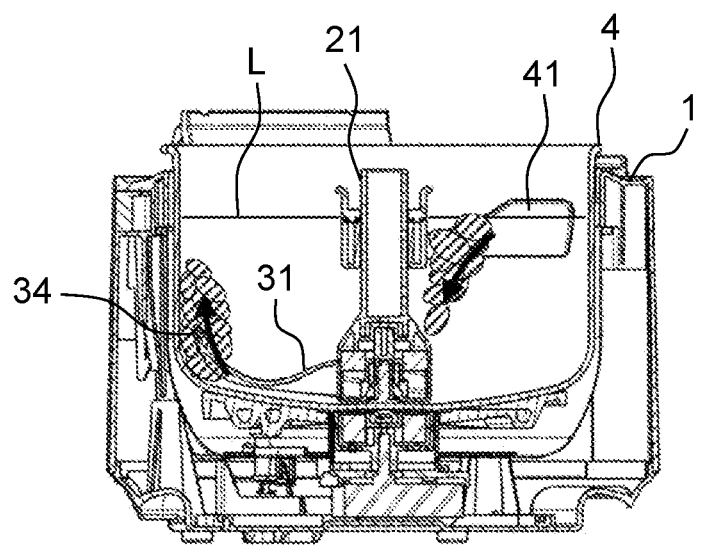
FIG. 8C is a sectional view taken along 8C-8C of FIG. 7C.
Figure 8D:
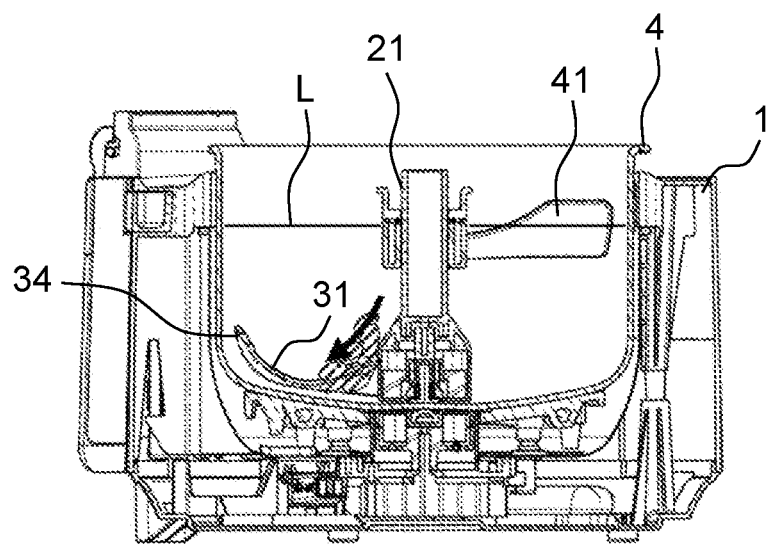
FIG. 8D is a sectional view taken along 8D-8D of FIG. 7D.

Thereafter, as stirring body 20 rotates further in rotating direction X1, the solids which have sunk toward bottom surface 4a of cooking container 4 by upper blade 41 move toward the downstream side of lower blade 31 in rotating direction X1 as shown in FIGS. 7D and 8D.

Thereafter, as stirring body 20 rotates further in rotating direction X1, lower blade 31 comes into contact with the solids positioned near bottom surface 4a of cooking container 4 and housing 21 as shown in FIGS. 7A and 8A. At this time, upper blade 41 comes into contact with the solids that has reached liquid surface L.

While stirring body 20 is rotated in rotating direction X1, the operations shown in FIGS. 7A to 7D and FIGS. 8A to 8D are repeated. In this way, vertical convection can be caused to the cooking materials including the liquid and the solids, thereby enabling more desirable stirring of the cooking materials.

The detailed description of obstacle 4A provided on inner peripheral surface 4b of cooking container 4 is given next.

Figure 9A:
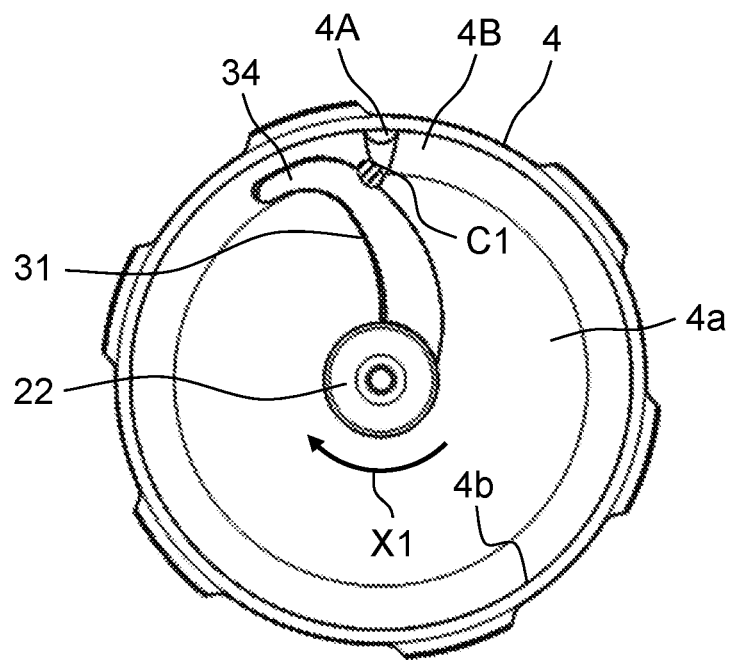
FIG. 9A is a plan view illustrating a positional relationship among a lower blade, an obstacle, and a cooking material when the lower blade of the stirring body stirs the cooking material in the heating cooker with the stirring function according to the exemplary embodiment of the present invention.
Figure 9B:
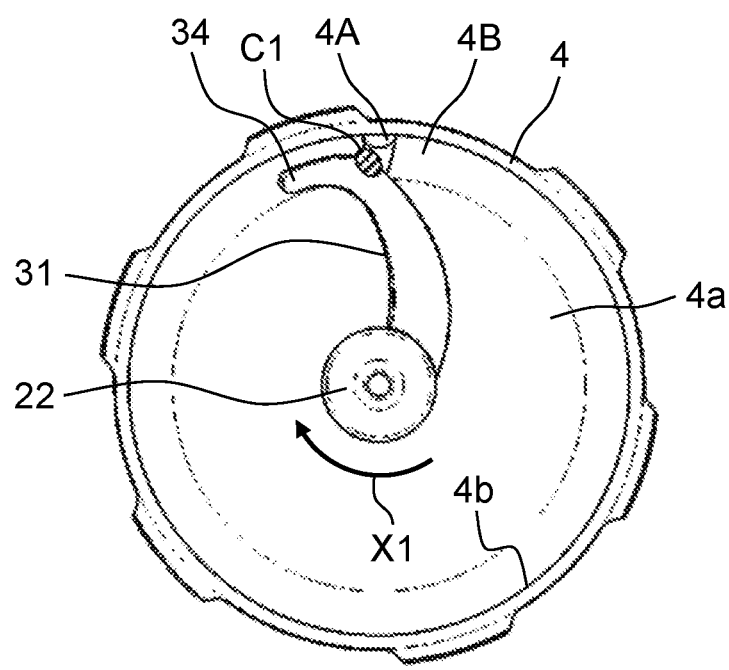
FIG. 9B is a plan view illustrating a positional relationship among the lower blade, the obstacle, and the cooking material when the lower blade of the stirring body stirs the cooking material in the heating cooker with the stirring function according to the exemplary embodiment of the present invention.
Figure 9C:
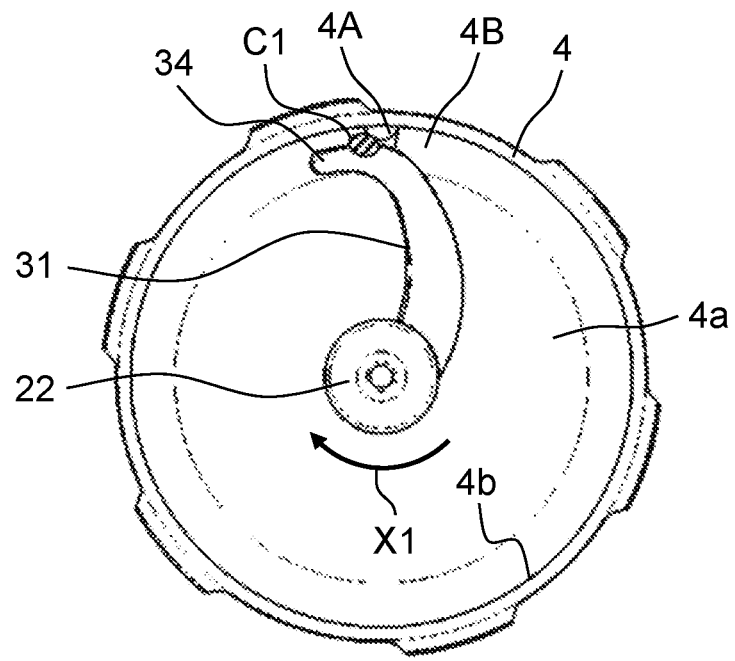
FIG. 9C is a plan view illustrating a positional relationship among the lower blade, the obstacle, and the cooking material when the lower blade of the stirring body stirs the cooking material in the heating cooker with the stirring function according to the exemplary embodiment of the present invention.

FIGS. 9A to 9D are plan views each illustrating a positional relationship among lower blade 31, obstacle 4A, and a cooking material when lower blade 31 stirs the cooking material. FIG. 10A is a partially cutaway perspective view of the heating cooker shown in FIG. 9A, FIG. 10B is a partially cutaway perspective view of the heating cooker shown in FIG. 9B, FIG. 10C is a partially cutaway perspective view of the heating cooker shown in FIG. 9C, and FIG. 10D is a partially cutaway perspective view of the heating cooker shown in FIG. 9D. It is to be noted that illustrations and descriptions of upper blade 41 and upper housing part 23 are omitted herein.

As shown in FIGS. 2 and 10A, obstacle 4A is provided to extend vertically and to project from inner peripheral surface 4b of cooking container 4 toward the center of cooking container 4. An amount of projection of obstacle 4A toward the center of cooking container 4 is, for example, 6 mm. Obstacle 4A is, for example, semicircular in horizontal section.

Lower end portion 4Aa of obstacle 4A is formed to curve along corner part 4B between bottom surface 4a and inner peripheral surface 4b of cooking container 4. A starting end of lower end portion 4Aa of obstacle 4A is positioned on bottom surface 4a of cooking container 4. Thus, a triangular area defined by leading end portion 34 of lower blade 31 and an end face of obstacle 4A and inner peripheral surface 4b of cooking container 4 moves upward along with the rotation of lower blade 31.

First, motor 9 is driven to transmit its rotational force to stirring body 20 via the magnetic coupling formed by driving magnet 7 and driven magnet 25, whereby lower blade 31 rotates in rotating direction X1. Lower blade 31 thus pushes cooking material C1 toward inner peripheral surface 4b of cooking container 4 as shown in FIGS. 9A and 10A. At this time, cooking material C1, which has failed to ride on leading end portion 34 of lower blade 31 and rotates together with lower blade 31, is caught between lower blade 31 and obstacle 4A through rotation of lower blade 31.

Thereafter, as stirring body 20 rotates further in rotating direction X1, cooking material C1 is moved in such a manner as to be raised along a curve of lower end portion 4Aa of obstacle 4A as shown in FIGS. 9B and 10B as a result of the triangular area that is defined by leading end portion 34 of lower blade 31 and an end face of obstacle 4A and inner peripheral surface 4b of cooking container 4 moving upward.

Thereafter, as stirring body 20 rotates further in rotating direction X1, cooking material C1 is pushed by leading end portion 34 of lower blade 31 as shown in FIGS. 9C and 10C, thus being brought up along obstacle 4A.

Figure 9D:
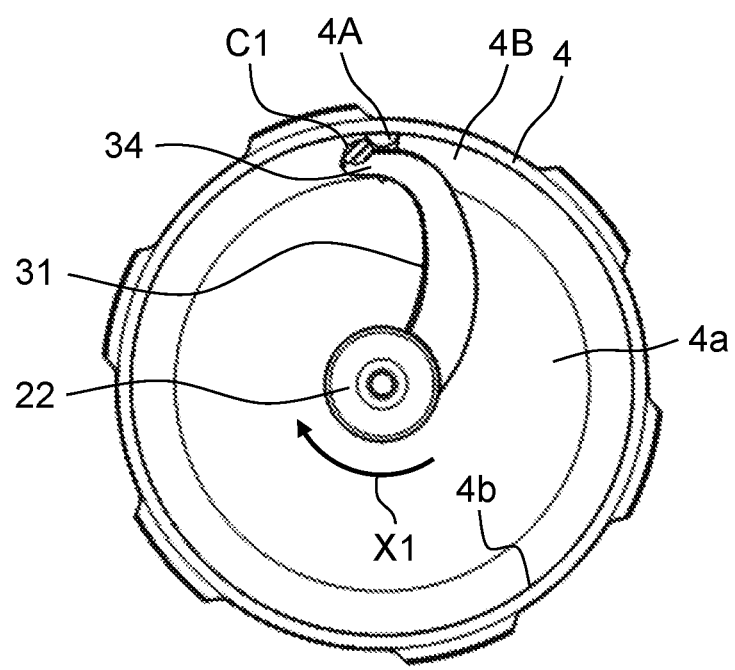
FIG. 9D is a plan view illustrating a positional relationship among the lower blade, the obstacle, and the cooking material when the lower blade of the stirring body stirs the cooking material in the heating cooker with the stirring function according to the exemplary embodiment of the present invention.
Figure 10A:
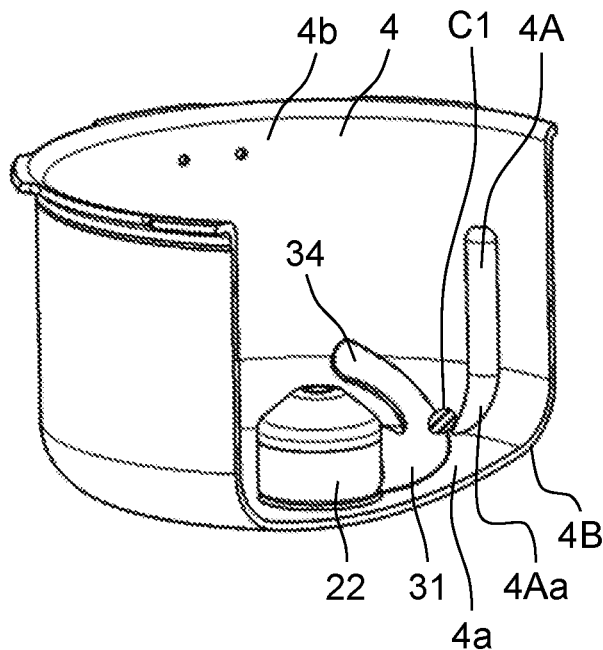
FIG. 10A is a partially cutaway perspective view of the heating cooker shown in FIG. 9A.
Figure 10B:
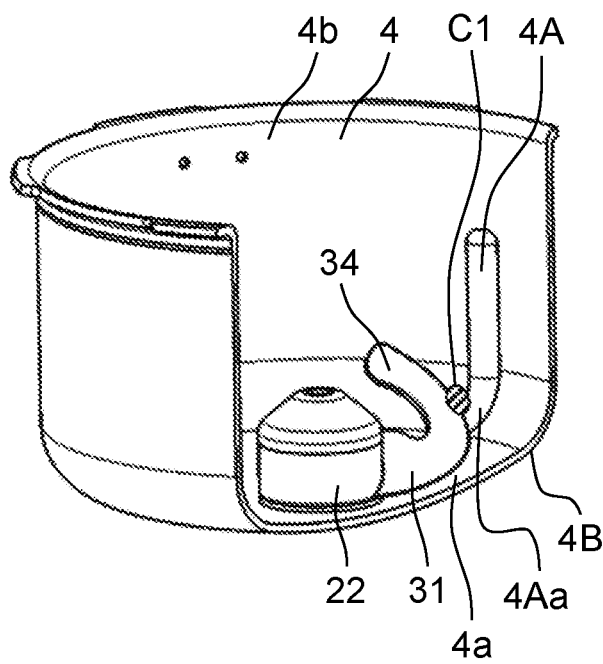
FIG. 10B is a partially cutaway perspective view of the heating cooker shown in FIG. 9B.
Figure 10C:
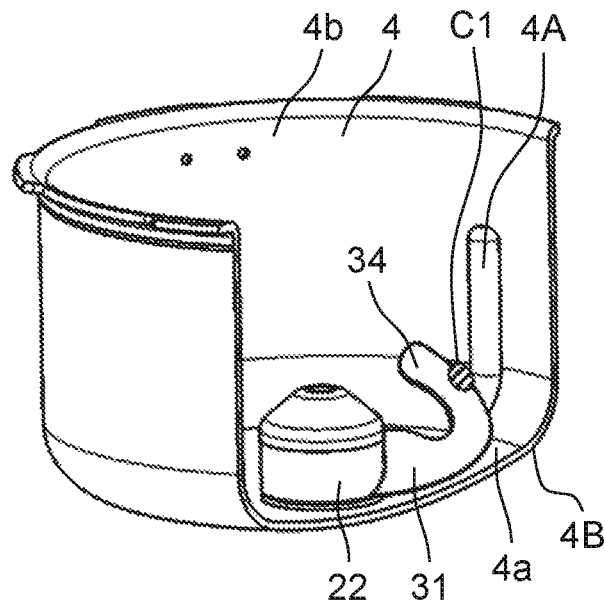
FIG. 10C is a partially cutaway perspective view of the heating cooker shown in FIG. 9C.
Figure 10D:
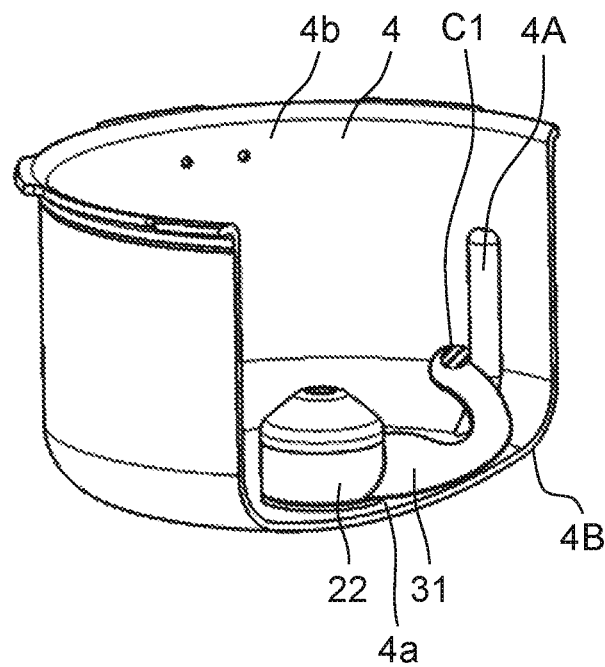
FIG. 10D is a partially cutaway perspective view of the heating cooker shown in FIG. 9D.

Thereafter, as stirring body 20 rotates further in rotating direction X1, cooking material C1 reaches a top of leading end portion 34 of lower blade 31 as shown in FIGS. 9D and 10D. Thereafter, cooking material C1 moves toward liquid surface L and comes into contact with upper blade 41.

According to the heating cooker of the present exemplary embodiment, stirring body 20 includes, in addition to lower blade 31, upper blade 41 that is configured to cause the cooking materials positioned above lower blade 31 to sink toward bottom surface 4a of cooking container 4. According to this structure, the solids floating near liquid surface L can be stirred sufficiently without high-speed rotation of stirring body 20 because upper blade 41 causes these solids to sink toward bottom surface 4a of cooking container 4. Consequently, the cooking materials including the liquid and the solids can be stirred in a more desirable manner.

According to the heating cooker of the present exemplary embodiment, upper blade 41 is disposed to vertically cross liquid surface L. With this structure, the solids floating on liquid surface L can also be caused to sink toward bottom surface 4a of cooking container 4 with more reliability, thus enabling more desirable stirring of the cooking materials including the liquid and the solids.

According to the heating cooker of the present exemplary embodiment, upper blade 41 is configured to draw, toward housing 21, the cooking materials that are positioned above lower blade 31 and near inner peripheral surface 4b of cooking container 4. With this structure, stirring force can be improved because the cooking materials positioned above lower blade 31 experience such force in a horizontal direction as to be drawn toward housing 21 and such force in a vertical direction as to be caused to sink toward bottom surface 4a of cooking container 4.

According to the heating cooker of the present exemplary embodiment, lower blade 31 is configured to raise upward the cooking materials pushed toward inner peripheral surface 4b of cooking container 4. With this structure, the cooking materials can be circulated among four regions, that is, a region near lower housing part 22, a region near a lower portion of inner peripheral surface 4b of cooking container 4, a region near an upper portion of inner peripheral surface 4b of cooking container 4, and a region near upper housing part 23. Consequently, the stirring force can be improved.

According to the heating cooker of the present exemplary embodiment, upper blade 41 is disposed to be displaced in rotating direction X1 with respect to lower blade 31 in plan view. With this structure, the movement of the cooking materials raised upward by lower blade 31 can be prevented from being hindered by upper blade 41.

According to the heating cooker of the present exemplary embodiment, upper blade 41 is configured to be vertically movable along housing 21. With this structure, the position of upper blade 41 can be adjusted vertically in accordance with the position of liquid surface L. Upper blade 41 can thus cause the solids floating near liquid surface L to sink toward bottom surface 4a of cooking container 4 with more reliability.

According to the heating cooker of the present exemplary embodiment, upper blade 41 is configured to float by the buoyancy exerted by the liquid. This structure eliminates the need for a user to adjust the position of upper blade 41 vertically in accordance with the position of liquid surface L.

According to the heating cooker of the present exemplary embodiment, upper blade 41 includes hollow part 43. According to this structure, upper blade 41 can have the buoyancy because of having hollow part 43 and thus can be made of a material having a higher specific gravity than the liquid. As a result, upper blade 41 can have improved rigidity and improved heat resistance even for use in a pressure heating cooker.

According to the heating cooker of the present exemplary embodiment, obstacle 4A is provided on inner peripheral surface 4b of cooking container 4, and the lower end portion of obstacle 4A is formed to curve along corner part 4B of cooking container 4. This structure enables further reduction of a clearance between lower blade 31 and obstacle 4A, so that the clearance between lower blade 31 and inner peripheral surface 4b of cooking container 4 can be prevented from being clogged with larger cooking materials, thereby preventing the rotation of lower blade 31 from being stopped. This structure also enables the cooking materials to be raised upward with more reliability. It is to be noted that at least one obstacle 4A may be provided on inner peripheral surface 4b of cooking container 4.

According to the heating cooker of the present exemplary embodiment, stirring body 20 is detachably mounted to the center of bottom surface 4a of cooking container 4 via the magnetic coupling. This structure provides excellent convenience because stirring body 20 can be cleaned with ease by being removed and can also be mounted with ease. This structure also eliminates, for example, the need for a through hole in the bottom of cooking container 4 for passage of a shaft that serves as a rotating shaft in order to transmit the rotational force to stirring body 20. Moreover, this structure enables stirring body 20 to move to such an extent that magnetic force acts to relieve a load even in cases where the clearance between lower blade 31 and inner peripheral surface 4b (or obstacle 4A) of cooking container 4 is clogged with the cooking materials. Thus, the rotation of lower blade 31 can be prevented from being stopped.

Figure 11:
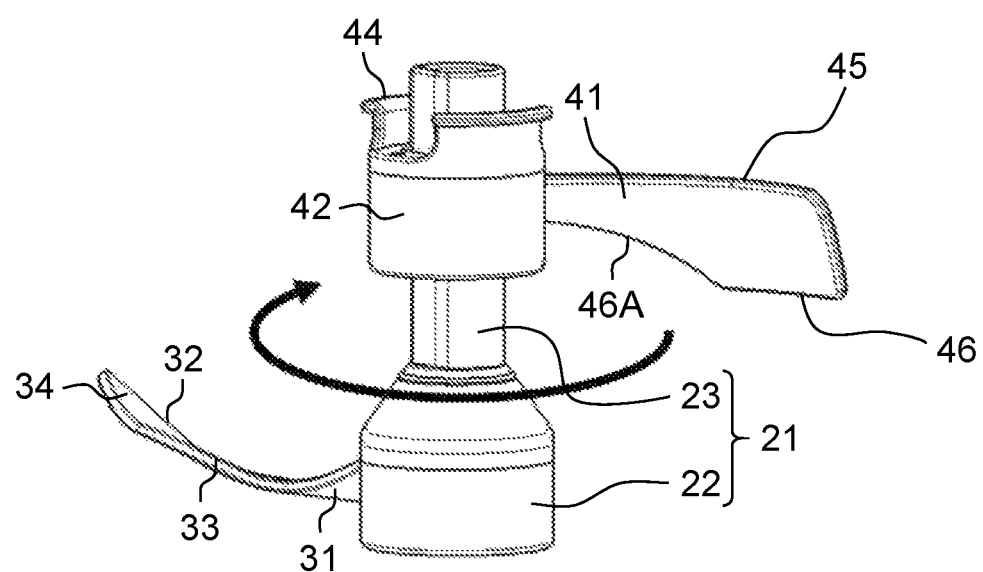
FIG. 11 is a perspective view illustrating a modified example of the stirring body of the heating cooker with the stirring function according to the exemplary embodiment of the present invention.

It is to be noted that the present invention is not limited to the exemplary embodiment, and the present invention can be carried out in other various exemplary embodiments. For example, in the structure shown in FIG. 4, front edge 45 serving as the upper edge of upper blade 41 has portion 45A that curves or slopes upward from the outer peripheral surface of housing 21 toward inner peripheral surface 4b of cooking container 4; however, the present invention is not limited thereto. As shown in FIG. 11, rear edge 46 that serves as a lower edge of upper blade 41 may, for example, have portion 46A that curves or slopes downward from the outer peripheral surface of housing 21 toward inner peripheral surface 4b of cooking container 4, with a leading end portion of upper blade 41 enlarged downward. According to this structure, even when the cooking materials are not raised by lower blade 31 to a position near liquid surface L, the leading end portion of upper blade 41 that is enlarged downward can catch these cooking materials more reliably.

In the structure shown in FIG. 5, upper blade 41 is disposed to be displaced about 180° in rotating direction X1 with respect to lower blade 31 in plan view; however, the present invention is not limited thereto. When an angle formed by upper blade 41 and lower blade 31 is too small, upper blade 41 can pass before the cooking materials are raised by lower blade 31 to a sufficiently higher position. On the other hand, when the angle formed by upper blade 41 and lower blade 31 is too large, lower blade 31 can pass before the cooking materials are caused to sink sufficiently by upper blade 41 toward bottom surface 4a. For the above reason, the angle formed by upper blade 41 and lower blade 31 preferably ranges from 90° to 270°.

In the structure shown in FIG. 10A, the starting end of lower end portion 4Aa of obstacle 4A is positioned on bottom surface 4a of cooking container 4; however, the present invention is not limited thereto. The starting end of lower end portion 4Aa of obstacle 4A may be positioned, for example, on corner part 4B of cooking container 4.

In the structure shown in FIG. 4, lower blade 31 and upper blade 41 are each formed by twisting one plate member; however, the present invention is not limited thereto. For example, lower blade 31 and upper blade 41 may each be formed of resin in a three-dimensional manner by injection molding.

It is to be noted that any appropriate combination of the various exemplary embodiments can produce corresponding effects.

INDUSTRIAL APPLICABILITY

The present invention enables more desirable stirring of cooking materials including liquid and solids and is thus useful for heating cookers each having a stirring function.

What is claimed is:
1. A heating cooker with a stirring function, the heating cooker comprising a stirring body configured to stir cooking materials that include liquid and a solid and are housed in a cooking container,
  wherein the stirring body includes:
    a housing rotatably mounted to a center of a bottom surface of the cooking container;
    a lower blade that extends from an outer peripheral surface of the housing toward an inner peripheral surface of the cooking container and is configured to push at least one of the cooking materials that is positioned near the bottom surface of the cooking container toward the inner peripheral surface of the cooking container; and an upper blade that extends from the outer peripheral surface of the housing toward the inner peripheral surface of the cooking container and is configured to cause at least one of the cooking materials that is positioned above the lower blade to sink toward the bottom surface of the cooking container, wherein:
the lower blade is formed to slope upward toward an upstream side in a rotating direction of the housing, and the upper blade is formed to slope downward toward an upstream side in a rotating direction of the housing, wherein the lower blade is configured to raise upward the at least one of the cooking materials that is pushed toward the inner peripheral surface of the cooking container, wherein the upper blade is configured to be vertically movable along the housing, wherein the stirring body is detachably mounted to the center of the bottom surface of the cooking container via a magnetic coupling.

2. The heating cooker according to claim 1, wherein the upper blade is disposed to vertically cross a liquid surface of the liquid and is configured to cause the at least one of the cooking materials that is near the liquid surface to sink toward the bottom surface of the cooking container.

3. The heating cooker according to claim 1, wherein the upper blade is configured to draw, toward the housing, the at least one of the cooking materials that is positioned near the inner peripheral surface of the cooking container and above the lower blade.

4. The heating cooker according to claim 1, wherein the upper blade is formed to curve convexly toward an upstream side in a rotating direction of the housing in plan view.

5. The heating cooker according to claim 1, wherein the upper blade is disposed to be displaced in a rotating direction of the housing with respect to the lower blade in plan view.

6. The heating cooker according to claim 5, wherein the upper blade and the lower blade form an angle ranging from 90° to 270°.

7. The heating cooker according to claim 1, wherein the upper blade is configured to float by buoyancy exerted by the liquid.

8. The heating cooker according to claim 7, wherein the upper blade includes a hollow part.

9. The heating cooker according to claim 7, wherein the upper blade is configured to be detachable from the housing, and includes a handle at a portion exposed as a result of the upper blade floating by the buoyancy exerted by the liquid.

10. The heating cooker according to claim 1, wherein an upper edge of the upper blade includes a portion curving or sloping upward from the outer peripheral surface of the housing toward the inner peripheral surface of the cooking container.

11. The heating cooker according to claim 1, wherein a lower edge of the upper blade includes a portion curving or sloping downward from the outer peripheral surface of the housing toward the inner peripheral surface of the cooking container.

12. The heating cooker according to claim 1, wherein an angle at which the upper blade is inclined with respect to a plane parallel to a rotating direction of the housing decreases in a direction from the inner peripheral surface of the cooking container toward the outer peripheral surface of the housing.

13. The heating cooker according to claim 1, wherein
the inner peripheral surface of the cooking container is provided with at least one obstacle that extends vertically and projects toward a center of the cooking container, and
a lower end portion of the obstacle curves along a corner part between the bottom surface and the inner peripheral surface of the cooking container.

14. The heating cooker according to claim 13, wherein a starting end of the lower end portion of the obstacle is positioned on the bottom surface of the cooking container.

* * * * *